(12) United States Patent
Yagawa

(10) Patent No.: US 9,063,538 B2
(45) Date of Patent: Jun. 23, 2015

(54) ARTICLE PROCESSING FACILITY AND METHOD OF OPERATION THEREOF

(75) Inventor: Kenji Yagawa, Ashiya (JP)

(73) Assignee: Daifuku Co., Ltd., Osaka-shi (JP)

( * ) Notice: Subject to any disclaimer, the term of this patent is extended or adjusted under 35 U.S.C. 154(b) by 134 days.

(21) Appl. No.: 13/600,818

(22) Filed: Aug. 31, 2012

(65) Prior Publication Data

US 2013/0238117 A1 Sep. 12, 2013

(30) Foreign Application Priority Data

Sep. 2, 2011 (JP) ................................. 2011-191987

(51) Int. Cl.
*G06F 7/00* (2006.01)
*G05B 19/418* (2006.01)

(52) U.S. Cl.
CPC ...... *G05B 19/41895* (2013.01); *G05B 19/4183* (2013.01); *G05B 2219/31311* (2013.01); *G05B 2219/31312* (2013.01)

(58) Field of Classification Search
CPC .............................................. G05B 19/41865
USPC ........................................................ 700/228
See application file for complete search history.

(56) References Cited

U.S. PATENT DOCUMENTS

| 2003/0147738 | A1* | 8/2003 | Hanel | 414/807 |
| 2006/0062656 | A1* | 3/2006 | Sugano et al. | 414/266 |
| 2009/0055209 | A1* | 2/2009 | Lahiri | 705/1 |
| 2009/0312864 | A1* | 12/2009 | Hanel | 700/214 |

FOREIGN PATENT DOCUMENTS

| JP | 04280703 A | 10/1992 |
| JP | 2004299878 A | 10/2004 |

* cited by examiner

*Primary Examiner* — Gene Crawford
*Assistant Examiner* — Kyle Logan
(74) *Attorney, Agent, or Firm* — The Webb Law Firm

(57) ABSTRACT

An article processing facility includes a transport control device which controls operation of at least one article transport device, management control device which transmits to the transport control device a transport command for transporting the article from a transport origin to a transport destination based on transport data with identifying information, and a display control which causes a display device to display transport-data-associated information. The management control device manages and stores attribute information of the article such that the attribute information is associated with identifying information which identifies the transport data. When the transport-data-associated information is selected with a selection device, the display control obtains the attribute information associated with the identifying information of the transport data that corresponds to the transport-data-associated information from the management control device and displays the attribute information on the display device.

10 Claims, 8 Drawing Sheets ns order to transport the article to be transported from the transport origin to the transport destination, both specified by the transport data.

When an article is transported by the at least one article transport device to the transport destination, the transport control means transmits transport completion information to the managing control means. When the managing control means receives the transport completion information from the transport control means, it determines that the transport operations based on the transport data are completed normally, and completes the processing of the transport data in question. This is how the managing control means manages the transport data.

The display control means causes the transport-data-associated information corresponding to the transport data to be displayed on the display means based on the transport data managed by the managing control means. And when the transport-data-associated information displayed on the display means is selected with the selecting means, the display control means is configured to obtain from the managing control means the attribute information associated with the identifying information for the transport data that corresponds to the transport-data-associated information, and to display the attribute information on the display means. As such, an operator can cause the attribute information of the article that is the subject of the transport operation for the transport data that corresponds to the transport-data-associated information to be displayed on the display means by operating the manually operated selecting means to select the transport-data-associated information displayed on the display means. Thus, it is not necessary to provide and operate, for example, a separate device for obtaining the attribute information from another managing means that manages the attribute information for the article in order to see the attribute information of the article that is the subject of the transport operation for the transport data that corresponds to the transport-data-associated information displayed on the display means.

Therefore, an article processing facility is provided in which an operator can simply select the transport-data-associated information displayed on the display means to see the attribute information on an article to be transported with ease.

Further, methods of operating an article processing facility that corresponds to the configurations described above are also within the scope of the present invention. And the methods of operation have the same or similar advantages as the corresponding features of the configurations.

A method of operation of an article processing facility in accordance with the present invention comprises: generating transport data by associating a transport origin and a transport destination for an article to be transported with unique identifying information; managing and storing the attribute information for the article that is a subject of a transport operation for the transport data such that the attribute information is associated with the identifying information that identifies the transport data; configuring the article processing facility such that a transport command for transporting an article to be transported from the transport origin to the transport destination is transmitted to the transport control means that control the operation of the at least one article transport device based on the transport data for the article to be transported; configuring the article processing facility such that transport-data-associated information that corresponds to the transport data is displayed on the display means; configuring the article processing facility such that, when the transport-data-associated information displayed on the display means is selected with the selecting means, the attribute information associated with the identifying information for the transport data that corresponds to the transport-data-associated information is obtained to display the attribute information on the display means.

DESCRIPTION OF THE PREFERRED EMBODIMENTS

Figure 1:
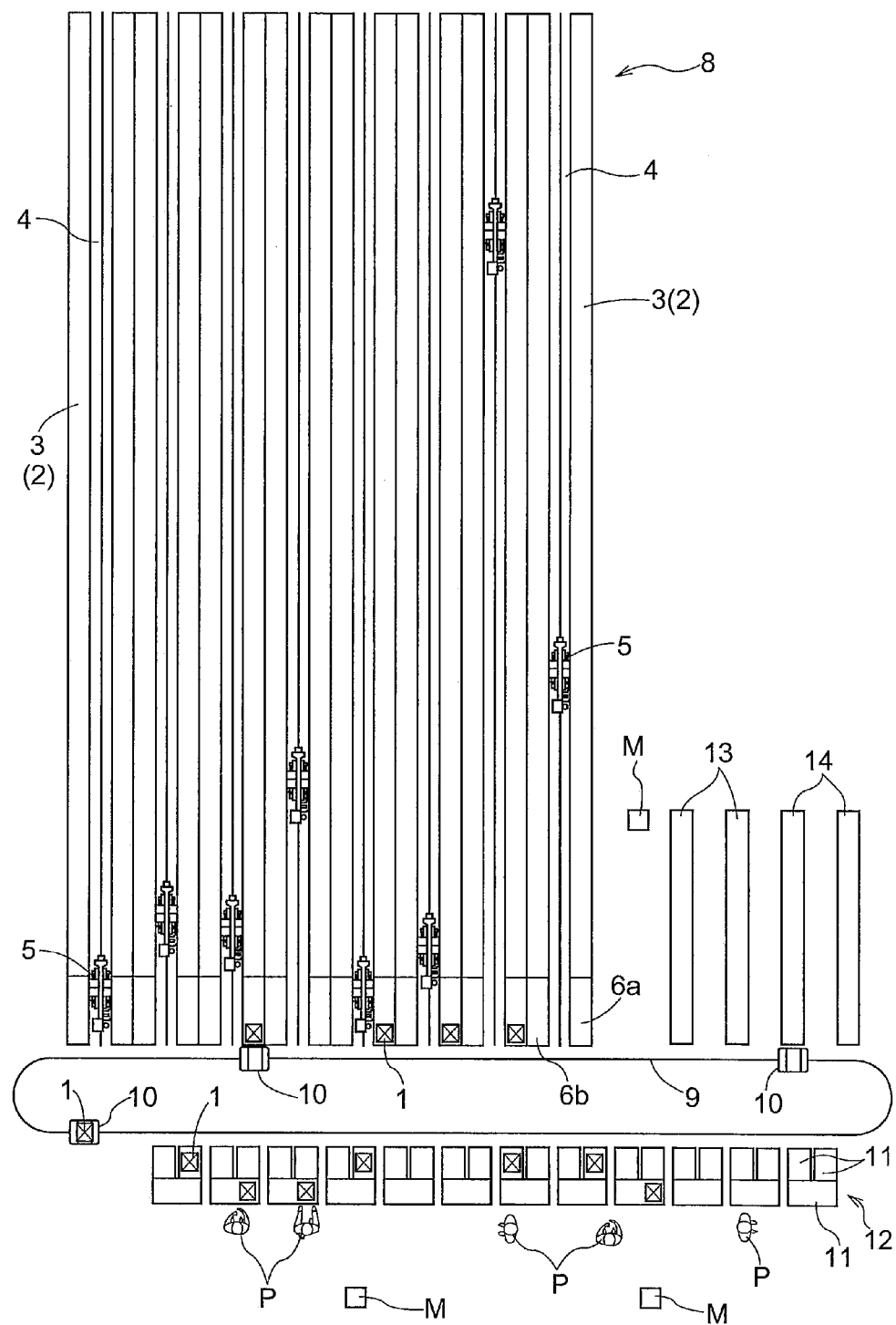
FIG. 1 is an overall plan view showing locations of elements of an automated storage facility.

The embodiment of the article processing facility in accordance with the present invention is described next using an example where the invention is applied to an automated storage facility and with reference to the drawings. In the present example, goods are brought in from outside the automated storage facility and stored (or stocked) in a plurality of racks provided in the facility. Goods are also retrieved from the plurality of racks and out to (i.e. delivered to) outside the automated storage facility. FIG. 1 is a plan view showing the arrangement or location of each portion of the automated storage facility. This automated storage facility includes, among other things, eight sets of automated warehouse units 8 arranged in a row along one direction, three self-propelling transport carriages 10, nine sets of item handling conveyors 12, two carrying-in conveyors 13, and two carrying-out conveyors 14. Each set of the automated warehouse unit 8 includes two racks 3 with each having a plurality of article storage spaces 2 for storing containers 1 (i.e. articles), a stacker crane 5 which travels under its own power along a travel path 4 formed between and along the two racks 3 and which stores containers 1 in, and retrieves containers 1 from, the racks 3, and a pair of conveyors, i.e., a storing conveyor 6a and a retrieving conveyor 6b, for transporting containers 1 between storing and retrieving positions for the stacker crane 5 and container loading position and unloading position. Each of the self-propelling transport carriage 10 loads a container 1 from the retrieving conveyor 6b or unloads a container 1 onto the storing conveyor 6a, and travel under its own power along the looped travel path 9 top to transport the container 1. Each of the item handling conveyors 12 includes three conveyors 11 which transfers containers 1 to or from the self-propelling transport carriage 10. Each of the carrying-in conveyor 13 transports the container 1 that has been carried in from the outside to a station for the self-propelling transport carriages 10. Each of the carrying-out conveyer 14 transports the container 1 to be taken out to outside from the station for the self-propelling transport carriages 10. The plurality of storage spaces provided in each rack 3 are arranged along the longitudinal direction of the rack as well as along the vertical direction. Each of the stacker cranes 5 of the racks 3 and each of the self-propelling transport carriages 10 includes a transfer device for supporting and transferring a container 1. This transfer device belongs to the conventional technology. And, for example, a transfer device having a plurality of forks that can be moved between a projected position and a retracted position and that can support a container 1, or a robot arm configured to be able to transfer a container 1 may be used as the transfer device. The transfer device used in each of the stacker cranes 5 is preferably configured to be able to transfer a container 1 stored in the rack located on either side of the stacker crane.

Each container 1 is configured to be able to hold a plurality of items (goods that are individually packaged in the present embodiment). And the various of article transporting apparatuses including the stacker cranes 5, the storing and retrieving conveyers 6, the self-propelling transport carriages 10, the item handling conveyors 12, the carrying-in conveyers 13, and the carrying-out conveyers 14, automatically transport containers 1 by transferring and relaying the containers 1 to or from each other.

Figure 2:
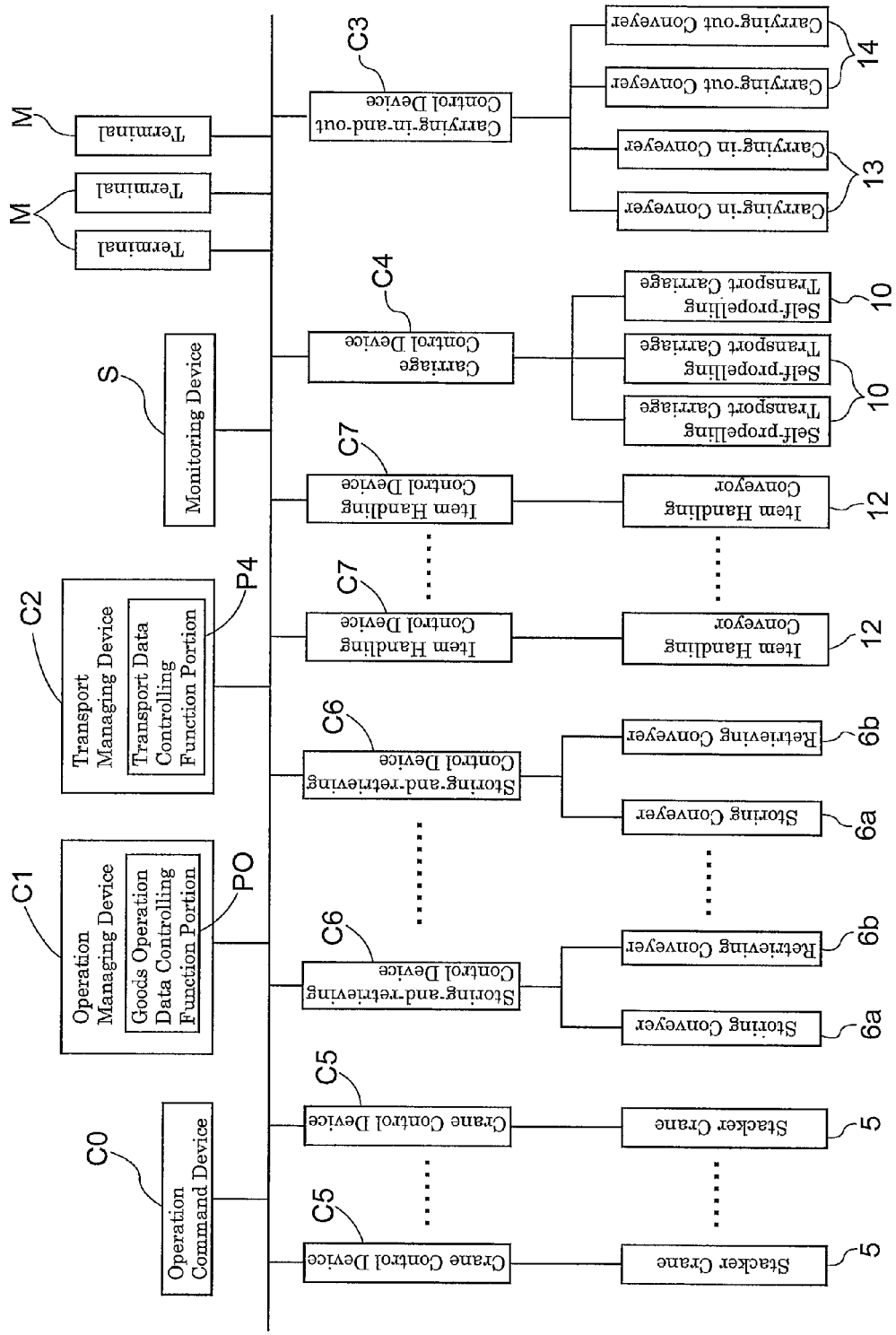
FIG. 2 is a control block diagram of the automated storage facility.

Each of the above-described article transporting apparatuses is connected to each control device for communication with each other as shown in FIG. 2. Each of these control devices is a computer having a communication control portion, an input-and-output portion, an information-processing portion, and memory, and controls the operation of each article transporting apparatus based on the transport data transmitted from the transport management device C2 described below. In addition, the functions of each control device (and devices described below that are computers) disclosed in the present specification are stored in respective memory as coded algorithms.

The carrying-in conveyers 13 and the carrying-out conveyers 14 are connected to and in communication with a carrying-in-and-out control device C3. The self-propelling transport carriages 10 are connected to and in communication with a carriage control device C4. Each of the stacker cranes 5 is connected to and in communication with its crane-control device C5. Each pair of storing conveyers 6a and the retrieving conveyers 6b are connected to and in communication with its storing-and-retrieving control device C6. Each item handling conveyor 12 is connected to and in communication with the item handling control device C7. The carriage control device C4 is connected for communication with the three self-propelling transport carriages 10 by means of wireless communication that uses feeder lines arranged along the travel path. In addition, the crane-control device C5 is connected for communication with the stacker cranes 5 by means of an infrared transmission device. The device that performs the wireless communication and the infrared transmission device belong to the conventional technology. And any other conventional wireless or wired communication apparatus may be used in place of these devices. Each of the carrying-in-and-out control device C3, the carriage control device C4, the crane-control device C5, the storing-and-retrieving control devices C6, and the item handling control devices C7 is also referred to as an apparatus control device.

The apparatus control devices C3-C7 are connected to the communication network provided in the automated storage facility through the communication-control portion provided to each of the apparatus control devices C3-C7. Connected to this communication network are an operation command device C0, an operation managing device C1, a transport managing device C2, a monitoring device S, and terminals (or monitors) M.

The operation command device C0, the operation managing device C1, the transport managing device C2, the monitoring device S, and the terminals M are also computers that include a communication control portion, an input-and-output portion, an information processing portion, and memory. The operation command device C0 commands outgoing and incoming shipment of goods as well as item handling as an operation request. And when an operation request is issued from the operation command device C0, the operation managing device C1 selects the corresponding container 1 as the subject of transport operation in order to handle the goods that are the subject of the operation request in accordance with the operation request, and generates transport data by associating the transport origin information and the transport destination information for the container 1 to be transported with a transport key which is a unique identifying information, and then transmits the transport data to the transport managing device C2. When the transport managing device C2 receives the transport data from the operation managing device C1, the transport managing device C2 issues, to the apparatus control devices C3-C7 which control the operations of the article transport apparatuses, transport commands for operating the various article transporting apparatuses, such as the stacker crane 5, the storing and retrieving conveyer 6, the self-propelling transport carriage 10, the item handling conveyor 12, the carrying-in conveyer 13, and the carrying-out conveyer 14 in order to transport the container 1 that is specified by the transport data from the transport origin to the transport destination.

For example, when an item handling operation request for certain goods is issued from the operation command device C0, the rack position (i.e., information that specifies the rack in which the container 1 in question is stored and position information within the specified rack) of the container 1 that holds the goods that are the subject of the item handling operation request and transport data that includes the position of the destination item handling conveyor 12 are transmitted from the operation managing device C1. Upon receiving this, the transport managing device C2 recognizes the rack position of the container 1 specified as the subject of the transport operation by the transport data, and transmits a transport command to the crane control device C5 of the corresponding automated warehouse unit 8 in order to retrieve the container 1 in question. The crane control device C5 causes the stacker crane 5 under its control to retrieve the container 1 from the rack 3 and to transfer it to the retrieving conveyer 6b based on the transport command. This operation includes the stacker crane 5 receiving the container 1 from the rack 3 by means of the transfer device of the stacker crane 5, and transferring of the container 1 from the stacker crane 5 to the retrieving conveyer 6b after moving the stacker crane 5. Upon completion of this operation, the crane control device C5 transmits transport completion information to the transport managing device C2. Next, the transport managing device C2 transmits a transport command to the storing-and-retrieving control device C6. And the storing-and-retrieving control device C6 causes the container 1 to be transported to a transport end by the retrieving conveyer 6b that is controlled by the control device C6 and transmits transport completion information when this operation is completed. Subsequently, the transport managing device C2 assigns a self-propelling transport carriage 10 to perform the transport operation and transmits to the carriage control device C4 a transport command for causing the assigned self-propelling transport carriage 10 to transport the container 1 to the item handling conveyor 12. This causes the self-propelling transport carriage 10 to transport the container 1 to the item handling conveyor 12. This operation includes the transfer device provided to the self-propelling transport carriage 10 receiving the container 1 from the retrieving conveyer 6b, and transferring the container 1 to this item handling conveyor 12 after the self-propelling transport carriage 10 has traveled to the specified item handling conveyor 12. The carriage control device C4 transmits transport completion information to the transport managing device C2 when the self-propelling transport carriage 10 completes this transport operation. Finally, the transport managing device C2 transmits a transport command to the item handling control device C7 to cause the item handling conveyor 12 to transport the container 1 to a predetermined transport position. And the item handling control device C7 transmits transport completion information to the transport managing device C2 when the item handling conveyor 12 completes the transport operation. And this causes the transport managing device C2 to determine that the container 1 was transported to the predetermined transport position of the item handling conveyor 12 which is the transport destination specified by the transport data, and to transmit a transport completion report to the operation managing device C1. Thus, the container 1 required for an item handling operation is transported from an article storage space 2 of the automated warehouse unit 8 to the predetermined transport position of the item handling conveyor 12 in this manner.

Various transport completion information which the transport managing device C2 receives from the crane-control device C5 etc. until the container 1 is transported to the predetermined transport position of the item handling conveyor 12 is transmitted to the operation managing device C1 as progress status information. This allows the operation managing device C1 to monitor the progress as to which article transporting apparatus the container 1 specified by the transport data as the subject of a transport operation has been transported to.

Stowing operations and removing operations, which are manually performed by a human operator P, are performed at predetermined transport positions of the item handling conveyors 12. A work location is set or defined for each of the nine sets of item handling conveyors 12. More specifically, a plurality of work locations are defined in the present embodiment. And nine item handling conveyors 12, each of which functions as a work location transporting apparatus, are provided in correspondence with the nine work locations. And the stacker cranes 5, the storing and retrieving conveyors 6, the self-propelling transport carriages 10, and the item handling conveyors 12 function as article transport devices for transporting the container 1 to be handled manually by the operator P from the transport origin to the work location that is the transport destination. In addition, each work location is configured to be suitable for performing both a stowing operation in which goods are placed into the container 1 and a removing operation in which goods are taken out of the container 1.

As such, a plurality of article transporting apparatuses (the stacker cranes 5, the storing and retrieving conveyor 6s, the self-propelling transport carriages 10, the item handling conveyors 12, the carrying-in conveyers 13, the carrying-out conveyers 14) that are capable of transferring an article to each other are provided as article transport devices. A plurality of apparatus control devices C3-C7 for controlling operation of respective article transporting apparatus are provided as transport control means (transport controller) for controlling the operations of the article transport devices. In addition, the operation managing device C1 and the transport managing device C2 function as managing control means (managing controller) for managing transport data which includes identifying information for identifying each of the plurality of containers 1 to be transported from a transport origin to a transport destination, and transport destination information assigned to every container to be transported.

And the transport managing device C2 issues transport data to the apparatus control devices C3-C7 in order to transport a subject container 1 from the transport origin to the transport destination. In this process, in order to relay and transport the container 1, that is specified by the transport data as the subject of the transport operation, from the transport origin to a work location by the plurality of article transporting apparatuses, the transport managing device C2 is configured to sequentially issue transport commands, based on the transport data, to each of the crane control device C5, the storing-and-retrieving control device C6, the carriage control-device C4, and the item handling control device C7 that function as the plurality of apparatus control devices, as described above.

Here, a batch processing is used in which the operation command device C0 treats one or more stock operation requests, one or more delivering operation requests, and one or more item handling operation requests that are generated within a predetermined period as one operation unit, and issues to the operation managing device C1 one operation command obtained by consolidating a plurality of operation requests for a number of goods that are included in this operation unit. Thus, the operation managing device C1 generates transport data that correspond to the plurality of operation requests, and manages or monitors the progress as well as the processing status (i.e. completed or not completed) for each of the plurality of transport data.

As the plurality of subject containers 1 are transported to the work locations that are the transport destinations, the operation managing device C1 is configured to monitor the number of not-yet-transported articles, which is the number of containers that have not reached the work locations among the plurality of containers 1 to be transported, from the number of the transport data for containers that have not reached their destinations based on the transport completion information which are transmitted from the control devices, such as the crane-control device C5, that function as transport control means. To describe in more detail, among the plurality of article transporting apparatuses, the item handling conveyors 12 (which are the work location transporting apparatuses for transporting the containers 1 to the work locations) monitor the number of the containers 1 that have not been transported to the work locations as the number of not-yet-transported articles.

In addition, when a container 1 that is transported as the subject of the transport data from the transport origin can not be properly transported to the transport destination due, for example, to a transporting problem on a transporting path, the operation managing device C1 determines that the transport operation was terminated abnormally (or in error) and stores the transport data for that container 1 as abnormal transporting data together with the progress data up to that point. On the other hand, when a container 1 that is transported as the subject of the transport data from the transport origin was properly transported to the transport destination, the operation managing device C1 determines that the transport operation was properly terminated and stores the transport data for that container 1 as normal transporting data together with all the progress data obtained throughout the travel path. In other words, the operation managing device C1 manages or keeps track of the transport data for the plurality of containers 1 to be transported by keeping the data for which the transport operations from the transport origins to the transport destinations were completed properly from the data for which the transport operations are completed abnormally.

More specifically, the operation managing device C1 has an administrative database for managing a plurality of transport data in its memory. The administrative database is a relational database in which data bases such as the transport master data and a commodity master data which is a data base for the information on the goods are associated with each other by the transport key.

By means of the administrative database, the information that make up the "transport data" specified by the transport key (i.e. information such as transport classification (i.e. article to be stored or retrieved), transport origin, transport destination, location number, etc.) is stored such that it is associated with the information which make up "goods and operations information" (information such as the goods code, lot number, name of the goods, number of operations, and source of the goods etc.) on the goods held in the container 1 that is specified by the transport data having the transport key in question as the subject of the transport operation. In other words, the operation managing device C1 is configured to manage the information that make up "goods and operations information" about the goods held by the container 1 as the attribute information of the container 1, that is the subject of transport operation of transport data, by storing it such that the information is associated with the transport key which functions as the identifying information for identifying the transport data.

In addition, when abnormality or an error occurs on the transporting path of the container 1, an error code is reported together with a transport key from an apparatus control device. And the abnormal condition code (or error code) is recorded such that the code is associated with the transport key. This allows the monitoring device S to analyze the number of times that abnormal conditions occur for each abnormal condition code as described below in more detail.

In addition, if the transport classification of the transport operation for a particular transport key is "storing", then a location number is a value that includes a rack number which specifies which one of the racks 3 contains the destination article storage space 2, a column number which specifies the position of the article storage space in the longitudinal direction of the rack, and a level number which specifies the position of the article storage space in the vertical direction. And if the transport classification of the transport key is "retrieving", then the location number is a value that includes the rack number of the rack 3 of the article storage space 2 that is the transport origin as well as the column number and the level number.

The monitoring device S and the terminals M are described next. The monitoring device S is a server which collects management information from the operation managing device C1 and the transport managing device C2 as well as control information from each of the apparatus control devices C3-C7 to monitor and analyze the state of the automated storage facility and to generate display information for displaying the results in a form which can be viewed by an operator. Upon receiving various display requests from a client terminal M, the monitoring device S generates the requested display information and transmits it to the terminal M.

Figure 3:
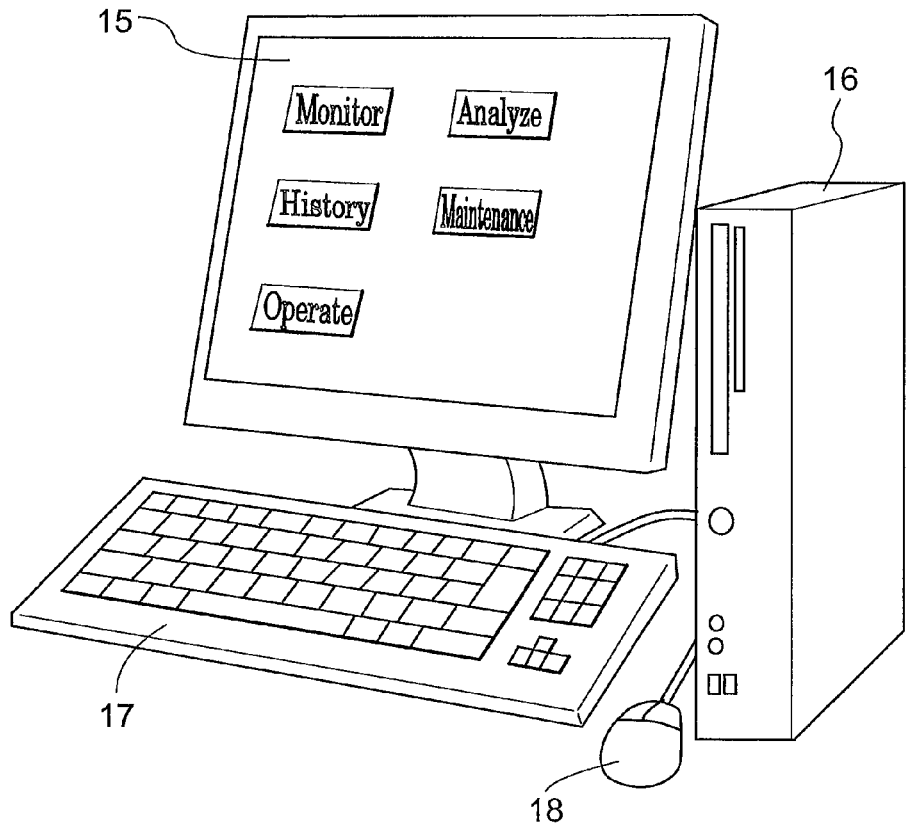
FIG. 3 is an exterior perspective view of a monitor terminal.

As shown in FIG. 3, a terminal M includes a display portion 15 which functions as display means for displaying the display information transmitted by the monitoring device S, a computer main body portion 16 having a communication control portion, an input-and-output portion, an information processing portion, and memory. The terminal M also includes a keyboard 17 and a mouse 18 that function as input means or selecting means (selector) for inputting display instructions for the monitoring device S. As shown in FIG. 1, a plurality of terminals M are located at proper locations over the area within the facility. In the present embodiment, one terminal M is provided for every three or four work locations as a viewing terminal which an operator who performs a stowing operation or a removing operation at a work location uses to see a projected operation status etc.

Figure 4:
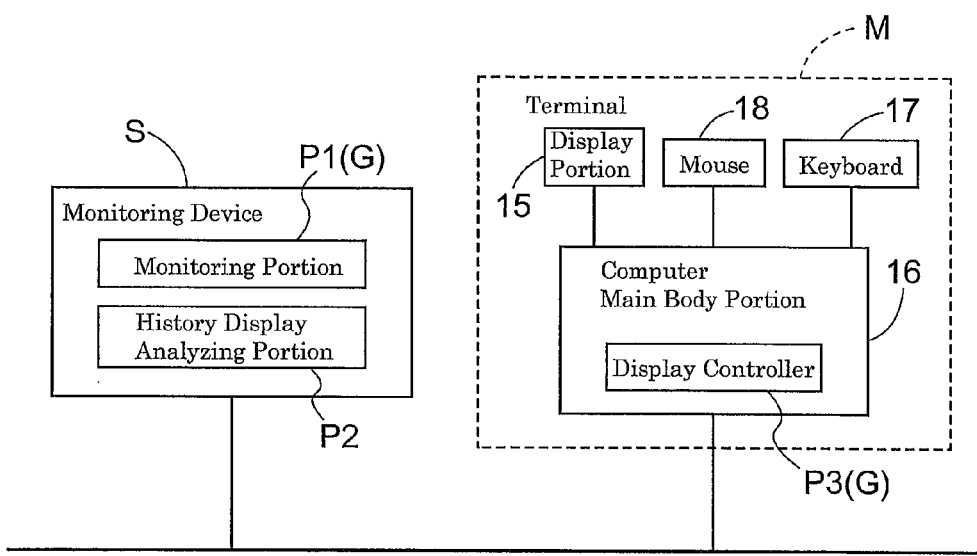
FIG. 4 is a block diagram showing a configuration of a monitoring device and a monitor terminal.

As shown in FIG. 4, the monitoring device S has a main body portion that includes a communication control portion, an input-and-output portion, an information processing portion, and memory. And the monitoring device S includes, in a form of computer programs, a monitoring portion P1 which displays on terminal M in real time, among other things, the operating state of the apparatuses within the transport facility of the automated storage facility and the processing status of transport operations, and a history display analyzing portion P2 which displays on the display portion of the terminal M, among other things, the operation history and abnormality history of the apparatuses in the transport facility, and the processing records of the transport operations. And the information-processing portion of the computer main body portion 16 in the terminal M includes, in a form of a computer program, a display control portion P3 which displays the display information generated by the monitoring device S on the display portion 15.

And the monitoring portion P1 of the monitoring device S generates display information to cause the display portion 15 to display the number of not-yet-transported articles which the operation managing device C1 monitors. This display information for the number of not-yet-transported articles is displayed on the display portion 15 in a viewable form by a display control action of the display control portion P3 of the terminal M. In other words, the display control means (display controller) G, that causes the number of not-yet-transported articles monitored by the operation managing device C1 to be displayed on the display portion 15, is defined or formed by the monitoring portion P1 of the monitoring device S and the display controller P3 of a terminal M.

Figure 5:
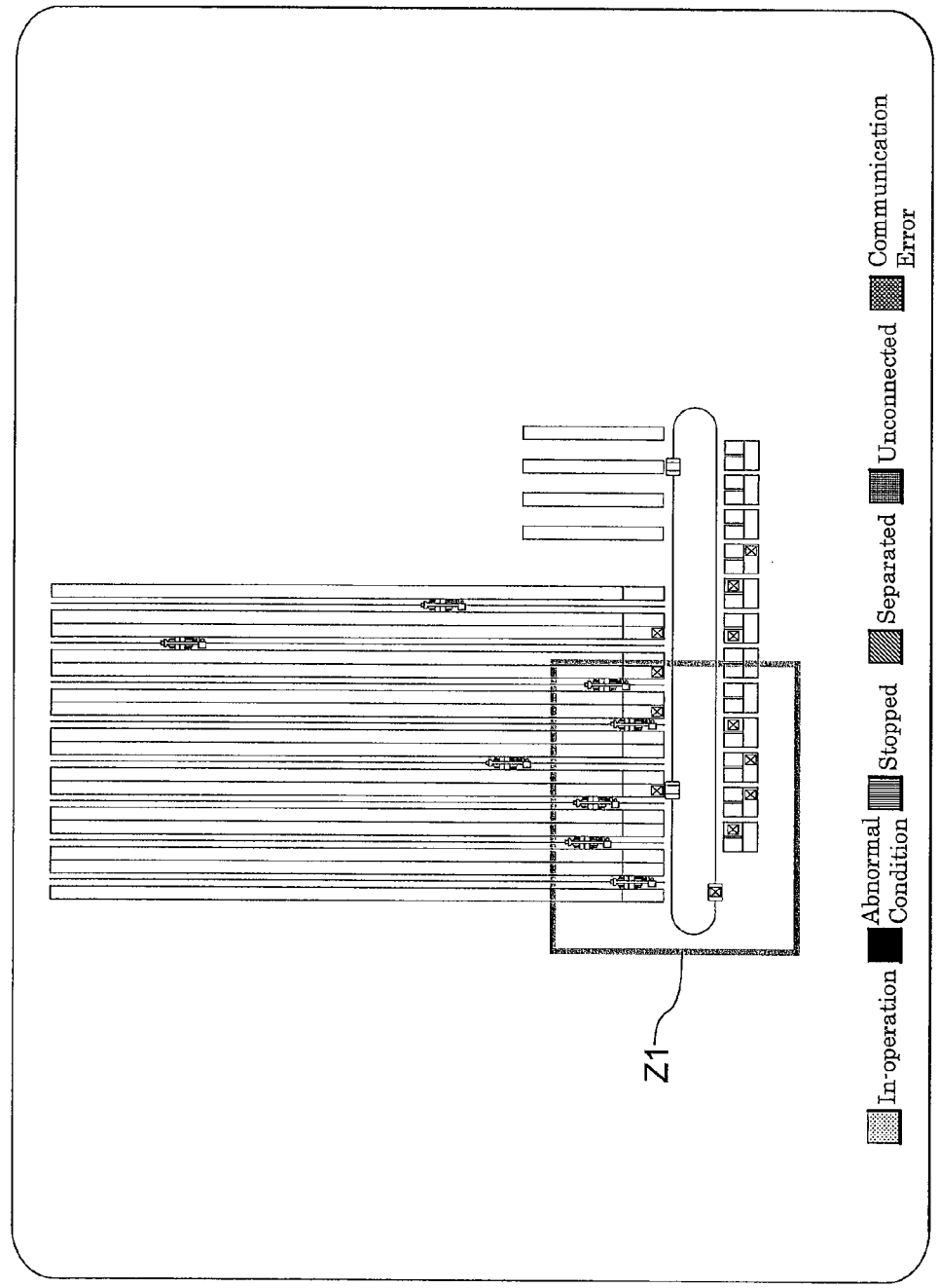
FIG. 5 is an initial screen of the monitoring menu option.

FIG. 3 shows the display portion 15 of the terminal M displaying initial screen information generated by the monitoring device S. And desired display information can be displayed, for example, by selecting various menu options by clicking once (single-clicking) after placing the mouse cursor over one of the menu options. While a mouse cursor (also called a pointer) is used to select displayed items in the present embodiment, other representation may be used instead. Unless stated otherwise, the act of "selecting" a displayed object such as a symbol, a menu option, and a command displayed on the display portion 15 in the present embodiment includes a command to display the information associated with the displayed object and/or a command to execute the selected command, etc. Selecting a displayed object may be done simply by placing the mouse cursor over the displayed object, or by single-clicking it after placing the cursor over the object, or by other operation of the mouse, or by a combination of an operation of the mouse and operation of the keyboard. The initial screen of the monitor menu option shown in FIG. 5 is displayed by selecting the "Monitor" menu option. And with this initial screen displayed, the number of not-yet-transported articles for an article transporting apparatus can be displayed by expanding the article transporting apparatus for which the number of not-yet-transported articles is desired to be displayed. Next, display information displayed on the display portion 15 by the display control means G is described.

As shown in FIG. 5, the layout of the entire automated storage facility is displayed in the initial screen of the "Monitor" menu (referred to hereinafter as the monitor menu option). When the area Z1 which is desired to be expanded is selected by dragging the mouse 18 and then an expansion display menu option is selected from the sub-menu (not shown) that is displayed by right-clicking, a screen or view shown in FIG. 6 appears on the display. In other words, the display control means G is configured to expand the view of the area Z1 to be expanded when the area Z1 to be expanded in the layout view is selected with the mouse 18, and a command to expand the area is issued. In addition, the screen moves to the initial screen for the monitor menu option shown in FIG. 5 when a reduction display menu is selected from the sub-menu displayed by right-clicking the mouse 18.

Figure 6:
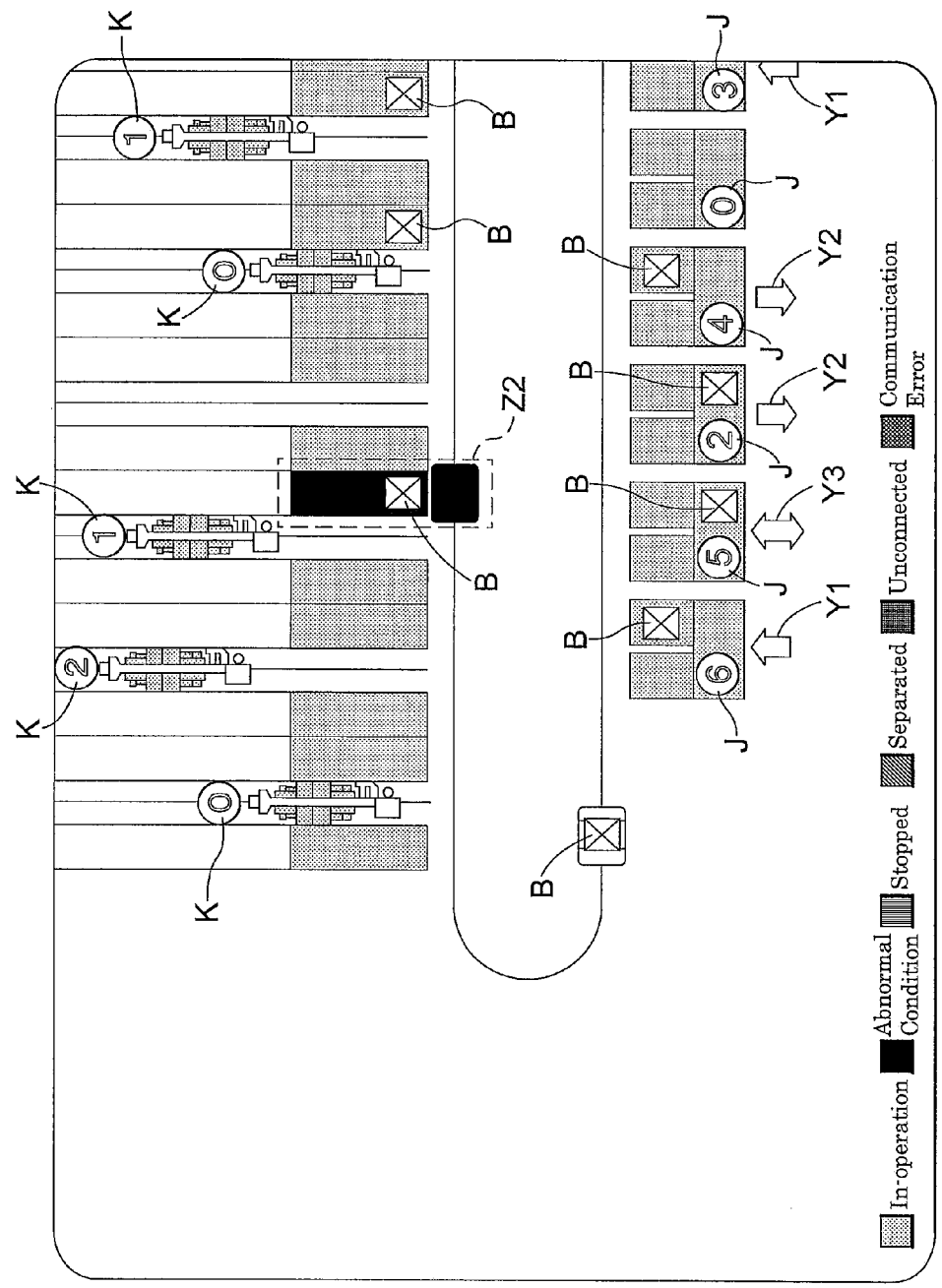
FIG. 6 is an expanded screen view of the monitoring menu option.

As shown in FIGS. 5 and 6, in the monitor menu option, the layout view is displayed in which symbols that represent respective article transporting apparatuses are displayed such that the locations of the symbols correspond to the actual locations or arrangement of the apparatuses. In other words, the display control means G is configured to display the layout view which shows the symbols, that represent respective ones of the plurality of article transporting apparatuses, at locations that correspond to the locations of the plurality of the transporting apparatuses. Here, the symbol may be an icon that can be displayed on the terminal M, or a character or a number, or a combination of the two. By using an icon having a simplified form of an object as the symbol that represents the specific object such as the rack 3 or the stacker crane 5, there is an advantage that it makes it easier for the operator P to recognize the symbol. However, the symbols in the present invention are not limited to this scheme.

In the layout view, the six operating states, namely, "In-operation", "Abnormal Condition", "Stopped", "Separated", "Unconnected", and "Communication Error" for each article transporting apparatus currently displayed on the screen is displayed such that each state can be identified by color coding the symbols. In addition, the display positions of the symbols that represent the stacker cranes 5 that are traveling along the travel paths 4 and the self-propelling transport carriages 10 that are traveling along the travel path 9 are updated in real time so as to correspond to the actual positions of the stacker cranes 5 and the self-propelling transport carriages 10 in the facility.

Figure 7:
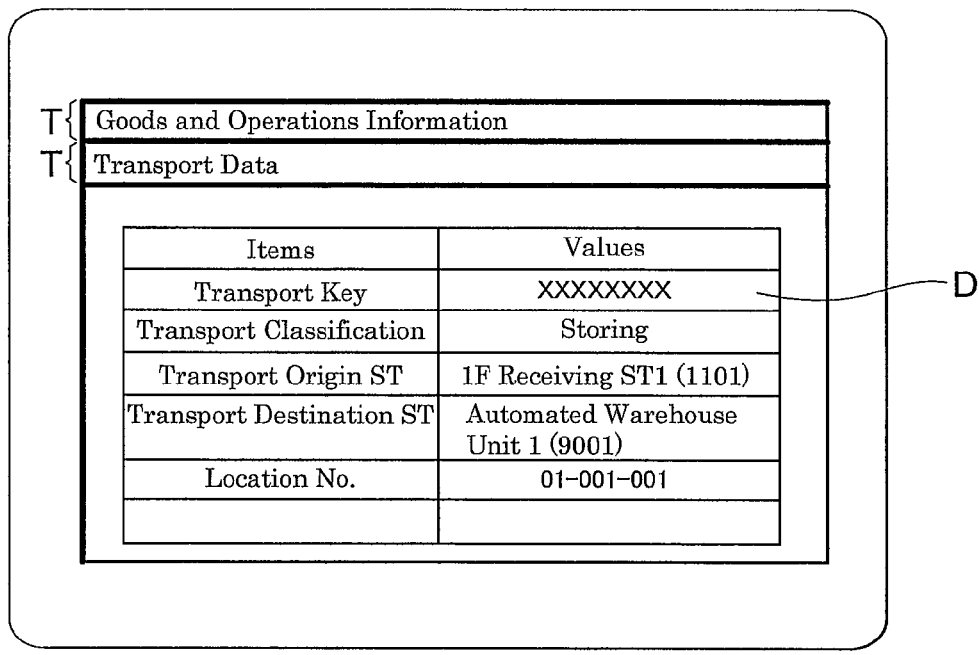
FIG. 7 shows how the contents of transport data are displayed.

As shown in FIG. 6, the layout screen shows the transport data symbol B. The transport data symbol B is a symbol that shows the transport data of the container 1 which an article transporting apparatus is currently transporting, and is transport-data-related-information about the transport data shown by the symbol B. The display control means G causes the symbol B of the transport data to be displayed such that the location of the symbol corresponds to the actual position along the transporting path of the container 1 that is specified by the transport data as the subject of the transport operation. And by selecting by double-clicking the transport data symbol B in the layout display with the mouse 18, the contents of the transport data about the container 1 which the transport data symbol B represents can be displayed as shown in FIG. 7.

Thus, the display control means G is configured to display in the layout screen, as transport-data-related-information, the symbol B that represents the container 1 that is specified by the transport data as the subject of a transport operation, so as to correspond to the actual transport position of the subject container 1, and is also configured to display the transport data about the container 1 on the display portion 15 when the transport symbol B of the container 1 is selected by the mouse 18.

In addition, a sub-menu (not shown) for rotating the layout view is displayed when the mouse 18 is right-clicked while the mouse cursor is located in an area in the layout view where there is no object to select. When a rotating operation menu option is selected, the display is switched where the layout view is rotated by a unit of 90 degrees. This allows the layout view to be displayed in the direction that is suited to the position or orientation of the operator P using the terminal M, which facilitates understanding of the correspondence between the actual layout of the facility and the layout view. Incidentally, the sub-menu that is displayed by right-clicking the mouse includes an menu option for reducing the display. And by selecting this option by placing the mouse cursor over it and clicking it, the view can be, for example, returned to the scale of the initial screen.

The container 1 that is the subject of the transport operation of each transport data managed by the operation managing device C1 is displayed in the layout screen as a symbol. This symbol for the container 1 is displayed such that it overlaps with the symbol of the article transporting apparatus that is currently transporting the container 1 so as to correspond to the progress of the transport operation of the container 1 as seen from the transport data. FIG. 6 shows an example in which the storing conveyer 6a and the self-propelling transport carriage 10 stopped at the station that corresponds to this conveyer 6a, both in the area shown at Z2 in the figure are in abnormal states. In addition, when the stacker crane 5 and the self-propelling transport carriage 10 are assigned to transport a container 1, the symbol for the container 1 will not be displayed on top of, or to overlap with, the symbol of the article transporting apparatus and instead is displayed on top of the symbol of the article transporting apparatus that was transporting the container 1 just prior to the transfer, until the article transporting apparatus (i.e., the stacker crane 5 or the self-propelling transport carriage 10) actually receives the container 1 thereon, that is, until the receiving cycle is completed.

When such abnormal condition occurs, it can be assumed that a problem occurred when the container 1 was transferred from the self-propelling transport carriage 10 to the storing conveyer 6a; thus, an operator P can go to the location and perform recovery work. In performing the recovery work, by viewing the displayed position of the container 1 in the layout view of the terminal M, the operator can see easily and quickly whether the container 1 should be placed on the self-propelling transport carriage 10 or on the storing conveyer 6a so that the actual location is consistent with the transport data. For example, the container 1 is shown to be located on the storing conveyer 6a in the example shown in FIG. 6. Thus, the above recovery procedure makes it unnecessary to take such steps as deleting the corresponding transport data after removing the container 1 in the recovery work from the abnormal condition. And this also prevents a secondary failure in which an abnormal condition occurs again because the article transporting apparatus that is recorded in the transport data as being assigned to transport the container 1 after the recovery work from the abnormal condition is different from the article transporting apparatus that is actually transporting the container 1. Thus the operation of the article transporting apparatus that was in the abnormal condition can be resumed such that the progress status recorded in the transport data is consistent with the actual transport position of the actual container 1.

As shown in FIG. 6, displayed close to or on top of the symbol that represents each article transporting apparatus in the layout view is the number of not-yet-transported articles which is the number of containers 1 that each article transporting apparatus has not transported yet among the containers 1 specified in transport data for a plurality of operation requests that are commanded or processed in a lump in a batch processing for each article transporting apparatus.

More specifically, a remaining transport operation number display portion K for the crane is displayed close to the symbol for the stacker crane 5. That is, a number which shows how many containers 1 each stacker crane 5 has yet to transport is displayed in the remaining transport operation number display portion K for the crane.

In addition, the display positions of the symbols for the cranes in the layout view move as the stacker cranes travel. Similarly, the display positions of the remaining transport operation number display portions K for the cranes also move so as to correspond to the movements of the display positions of the symbols for the stacker cranes 5.

In addition, with regard to the item handling conveyors 12, the remaining transport operation number display portion J for the operators is displayed so as to overlap with the symbol for the corresponding item handling conveyor 12. And a number which shows how many containers 1 each item handling conveyor 12 has yet to transport is displayed in the remaining transport operation number display portion K for the operators. In other words, the display control means G is configured to be able to display the number of not-yet-transported articles for each item handling conveyor 12 in association with the symbol that represents the item handling conveyor 12 in the layout view. This allows each operator P to grasp accurately the number of planned item handling operations at the work location the operator is in charge of as well as the number of remaining work operations at the work locations that other operators are in charge of. This makes it easy to develop schedule for work operations. For example, providing assistance to other work location with a large number of remaining work operations may be planned. In addition, since the amount of operation load at each work location can be grasped, it becomes easy to develop staff assignment schedule.

Displayed below the symbol of each item handling conveyor 12 in the layout display is an arrow-head symbol Y1-Y3 that distinguishably indicates whether the number shown in the remaining transport operation number display portion J for the operators represents the number of stowing operations, or the number of removing operations, or the number of both operations. The arrow-head symbol Y1 indicates that the number shown in the remaining transport operation number display portion J for the operators is the number of stowing operations. The arrow-head symbol Y2 indicates that the number shown in the remaining transport operation number display portion J for the operators is the number of removing operations. The arrow-head symbol Y3 indicates that the number shown in the remaining transport operation number display portion J for the operators is the number of both the stowing and removing operations.

The sum total number of operations of the number of stowing operations and the number of removing operations is displayed in the remaining transport operation number display portion J for the operators for work locations (among the work locations of the item handling conveyors 12) to which both the containers for stowing operations and containers for removing operations are transported (i.e. the work location for which the arrow-head symbol Y3 is displayed in FIG. 6) among the plurality of containers 1 that are subsequently transported based on uncompleted transport data. In other words, the display control means G is configured to display on the display portion 15 as the number of not-yet-transported articles, the sum of the number of transport data for the containers that have not yet transported to the work locations among the containers 1 for stowing operations and the number of the transport data for the containers that have not yet transported to the work locations among the containers 1 for removing operations.

By selecting the remaining transport operation number display portion K for the crane or the remaining transport operation number display portion J for the operators in the layout display by double-clicking with the mouse 18, the contents of the transport data for the container 1 that is part of the remaining work operation can be displayed as shown in FIG. 7.

In other words, the display control means G is provided for displaying on the display portion 15 the number of remaining work operations for the crane as well as the number of remaining work operations for the operators, as transport-data-associated information that corresponds to the transport data, based on the transport data managed by the operation managing device C1, and the transport managing device C2. When the remaining transport operation number display portion K for the crane or the remaining transport operation number display portion J for the operators in which the display control means G displays the transport-data-associated information in the display portion 15 is manually selected by an operation of the mouse, the display control means G is configured to display the contents of the transport data for the not-yet-transported containers for which the number of not-yet-transported articles is currently displayed as the transport-data-associated information.

In addition, while not shown in FIG. 7, a page change button is displayed in the view for displaying the contents of transport data. And the contents of a plurality of transport data can be displayed sequentially by switching the displayed page by clicking this page change button with the mouse or by issuing a page change command with a keyboard.

In addition, by selecting by double-clicking with the mouse 18 the remaining transport operation number display portion J for the operators for work locations at which the both the containers for the stowing operation and containers for the removing operation are scheduled to arrive, a sorted-by-operation-classification display portion that displays the number of remaining work operations for each operation type is displayed. And by selecting by double-clicking with the mouse 18 a remaining stowing operations number display portion or a remaining removing operation number display portion, both of which define the sorted-by-operation-classification display portion, the contents of the transport data can be displayed for the containers 1 to which the remaining operations are to be performed in the selected operation classification as shown in FIG. 7. Thus, the contents of the transport data for the containers 1 to which stowing operations are to be performed and the contents of the transport data for the containers 1 to which removing operations are to be performed can be displayed separately.

Figure 8:
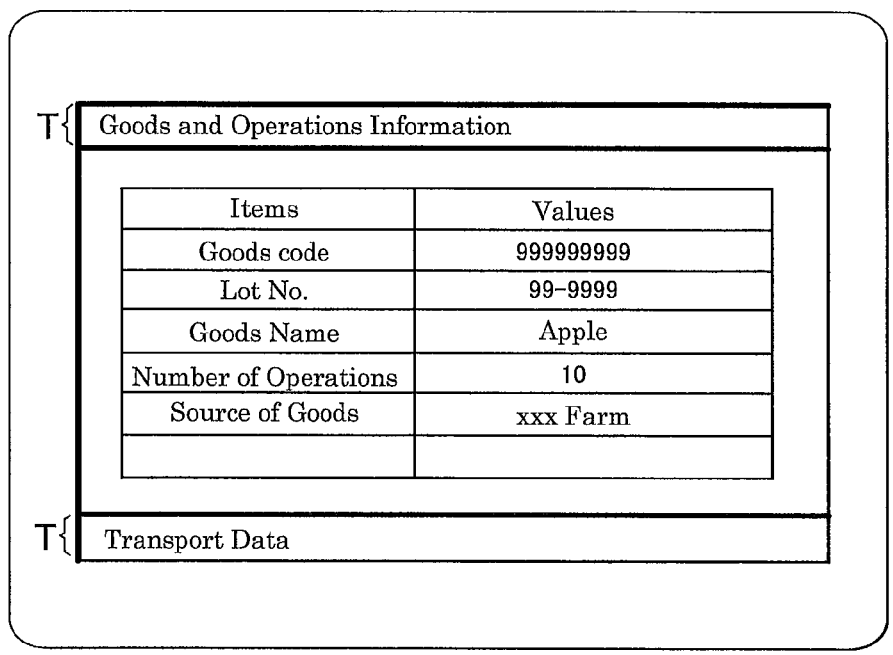
FIG. 8 shows how the contents of goods and operations information are displayed.

When the title bar T that says "Goods and Operations Information" is selected by clicking it with the mouse while the contents of the transport data for a not-yet-transported container is displayed as shown in FIG. 7, the display switches to one for goods and operations information shown in FIG. 8. The goods and operations information screen shown in FIG. 8 displays the information for the goods held in the container 1 that is the subject of the transport operation of the transport data identified by the transport key D shown in FIG. 7.

In other words, the title bar T in the display area of the transport data currently displayed on the display portion 15 is transport-data-associated information that corresponds to, or is associated with, the transport data in question. The display control means G is configured to obtain attribute information for the container 1 associated with the transport key of the transport data corresponding to the transport-data-associated information in question from the operation managing device C1 and to display the attribute information on the display portion 15 when the transport-data-associated information is selected with the mouse 18.

In addition, if the title bar T that says "Transport Data" is selected by clicking it with the mouse while the goods and operations information shown in FIG. 8 is displayed, the display switches to one for showing the transport data as shown in FIG. 7.

The mechanism of how the goods and operations information is displayed is described next. When the title bar T that says "Goods and Operations Information" is selected by clicking it with the mouse, the display controller P3 provided to the terminal M as the display control means G sends a request, to the monitoring portion P1 provided to the monitoring device S as the display control means G, for display information for the information on the goods held in the container 1 that is the subject of the transport operation of transport data and the associated operations. The monitoring portion P1 of the monitoring device S sends a request to the operation managing device C1 for the goods and operations information associated with the transport key in question. And the operation managing device C1 makes reference to, or obtains, the information on the goods associated with the transport key in question from the commodity master data within the administrative database, and sends the information of goods in question is transmitted to the monitoring device S. The monitoring portion P1 of the monitoring device S generates the display information for displaying it on the terminal M based on the information on the goods received from the operation managing device C1 and transmits it to the terminal M. And the display controller P3 of the terminal M displays the goods and operations information on the display portion 15 based on the display information received from the monitoring device S.

Since the number of containers 1 each of the article transporting apparatuses provided in the facility has left to transport is displayed on the terminals M in a easily recognizable manner in the automated storage facility in accordance with the present embodiment, the operators P can grasp the precise status of the facility. In addition, required work can also be checked at the item handling conveyors 12.

When the "Analyze" menu option is selected by operating the mouse and the mouse cursor in the initial screen of the terminal M shown in FIG. 3, the transport data that have been processed by the operation managing device C1 and the transport managing device C2 in the past is collected and the result of the analysis of the collected data with various conditions can be displayed on the display portion 15 in a manner that can be viewed by an operator. For example, as shown in FIG. 9, for the transport data for operations that terminated abnormally, the number of the abnormal transport data for each abnormal condition code or error code for one or more article transporting apparatuses specified by the display scope specifying portion within the specified period specified in the display period specifying portion can be displayed on a graph.

Figure 9:
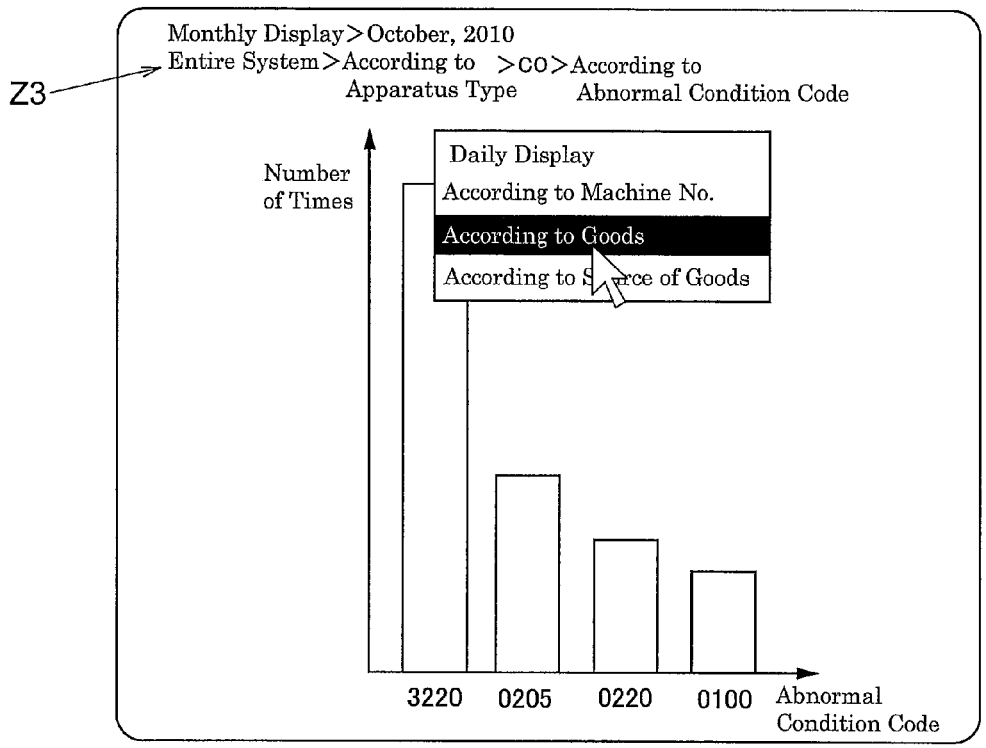
FIG. 9 is an analysis display screen showing abnormal transport data for different abnormal condition codes.
Figure 10:
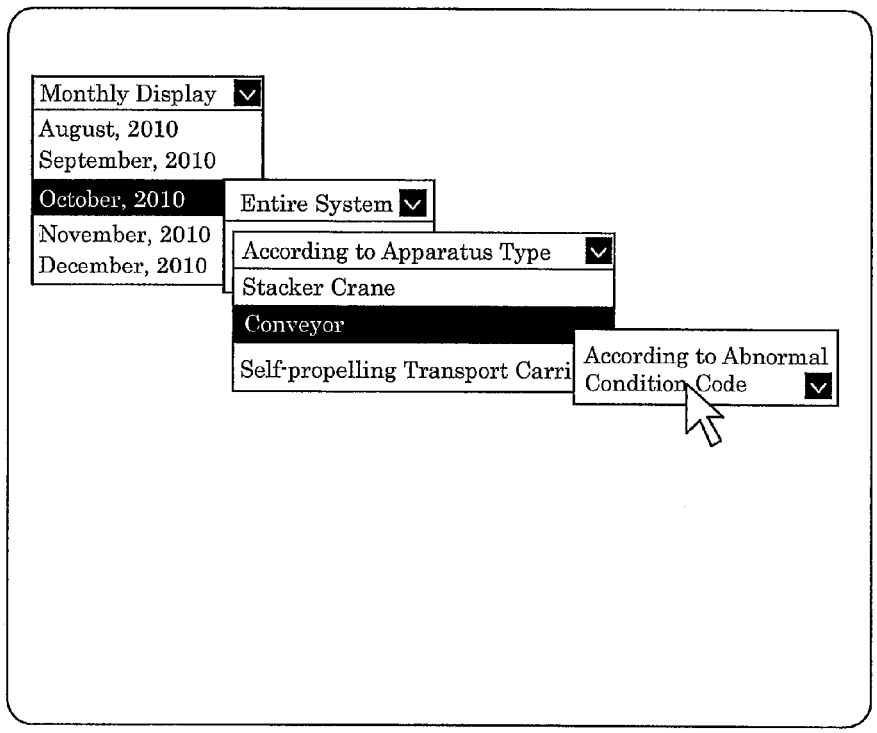
FIG. 10 is an explanatory diagram showing display change instructions for switching the period and scope displayed in the analysis display screen.

Referring to FIG. 9, if, for example, the item "October, 2010" displayed in the display condition specifying area Z3 is clicked with the mouse 18, a selection menu shown in FIG. 10 is displayed. And if "November, 2010" is selected from the menu, the abnormal transporting data generated during the specified month that was switched to is analyzed, and the graph is updated. In addition, if "Monthly Display" is clicked and then "Display By Year" is selected, a display area appears to the right in which a year can be selected so that, by specifying the desired year by the same operation as when changing the month to be specified, the abnormal transporting data generated during that one year period is analyzed and the graph is updated. Thus, display change commands can be issued by selecting, or switching among, various items displayed in the display condition specifying area Z3 by operating the mouse. And this allows The display of the analysis display screen can be switched to the one that meets desired conditions. Incidentally, although the selection menus for a plurality of display change commands are displayed simultaneously in FIG. 10 for the convenience of describing the commands, display change commands will be issued individually in practice.

Figure 11:
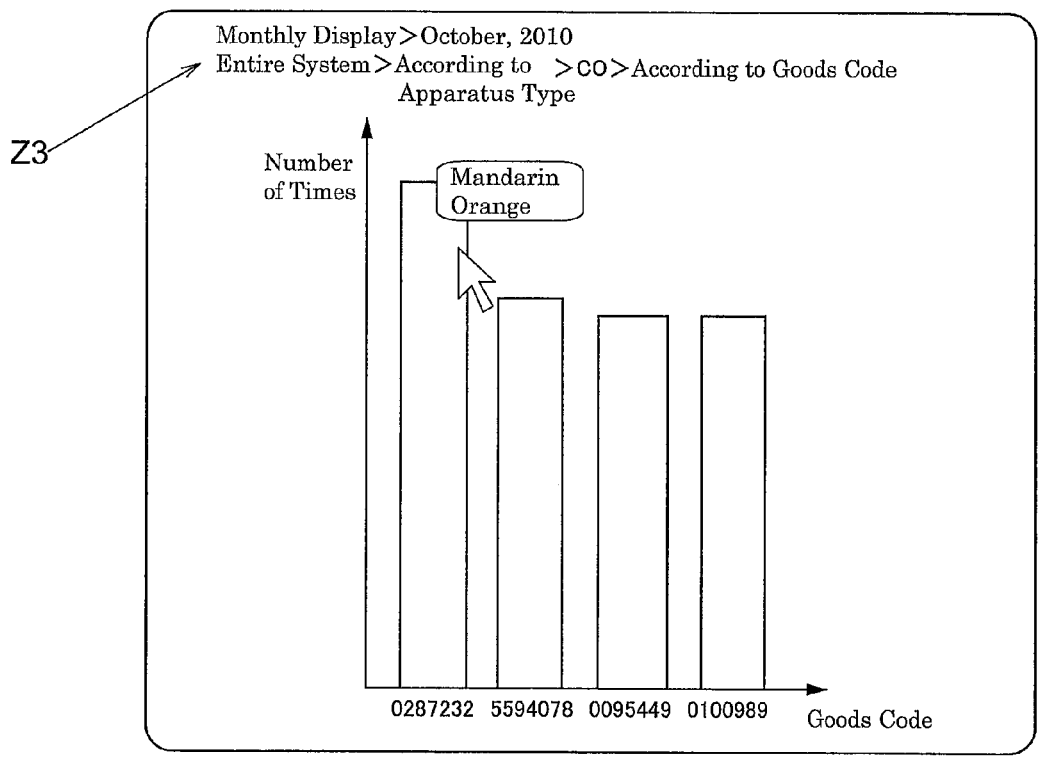
FIG. 11 is an analysis display screen showing abnormal transport data for different goods codes.

In the display in which the number for each abnormal condition code is separately displayed as shown in FIG. 9, by right-clicking the mouse while the mouse cursor is placed over the bar graph that shows the number of abnormal transporting data in which a certain abnormal condition code was recorded, the result of compiling the transport data, that are currently analyzed and displayed, depending on the goods or on the source of the goods can be displayed in a form of a graph. In the present embodiment, the name of the goods associated with a unique goods code is recorded in the commodity master data for each goods. And a graphical representation of the number of abnormal transporting data for each goods code can be displayed as shown in FIG. 11. In addition, as shown in FIG. 11, the name of the goods that corresponds to a certain goods code can be displayed by placing the mouse cursor over the area that shows the number of abnormal transporting data for the goods code. Since the goods code "0287232" is recorded such that it is associated with the name of the goods "Mandarin orange" in the present embodiment, "Mandarin orange" is displayed in FIG. 11.

In addition, when data is compiled according to each goods or according to the source of the goods, any period or scope in the display condition specifying area Z3 may be selected. For example, the specified range in the display condition specifying area Z3 in FIG. 11 may be changed after switching to the display in which data is shown for, or according to, each goods code. As such, the specified period and specified scope can be changed even after compiling the data according to each goods or according to the source of the goods through an operation identical to the operation in the display condition specifying area Z3 shown in FIG. 9.

Thus, when an analysis display command for analyzing and displaying the transport data for transport operations that terminated abnormally is issued, the display control means G is configured: to obtain from the operation managing device C1 the goods code which is the kind information of the goods held in the container 1 as the kind information which is attribute information associated with the transport key of the transport data for transport operations that terminated abnormally to analyze the transport data for the transport operations that terminated abnormally, and; to display on the display portion 15 the number of abnormal transporting data for each goods code of the goods held in the container 1 that is the subject of the transport operation of the transport data.

Thus, the abnormal transporting data for a given abnormal condition code can be easily analyzed based on the goods information which is attribute information for the containers 1, for example, to see which goods may tend to cause abnormalities or goods from which source tend to cause abnormalities. And since the display means would show that the transport data that specify that type of containers 1 tend to have a greater number of data with abnormally completed operations, it would be easier to see that the cause of a transporting problem is unique to that type of containers 1, which in turn makes it easier to take appropriate measures.

In an embodiment of the article processing facility in accordance with the present invention, the managing control means is preferably configured to manage the transport data for a plurality of articles to be transported such that the transport data for which transport operations from the transport origins to the transport destinations are completed normally are distinguished from the transport data for which transport operations are completed abnormally. And when an analysis display command for analyzing and displaying the transport data for transport operations that are completed abnormally. And the display control means is preferably configured to obtain, from the managing control means, kind information which identifies kinds of one or both of the articles and items that are held in the articles as the attribute information associated with the identifying information for the transport data for transport operations that are completed abnormally, and to display on the display means a number of the transport data for transport operations that are completed abnormally according to the kind of one or both of the articles and the items held in the articles that are subjects of transport operations for the transport data.

With such a configuration, when an operator issues a command or when an analysis display command is issued automatically, the display control means obtains from the managing control means kind information which identifies kinds of one or both of the articles and items that are held in the articles associated with the identifying information for the transport data for which transport operations are completed abnormally, and analyzes the transport data for which transport operations are completed abnormally, and displays on the display means a number of the transport data for transport operations that are completed abnormally according to the kind of one or both of the articles and the items held in the articles that are subjects of transport operations for the transport data.

Then, the transport operation for the transport data that specifies the article as the subject of the transport operation is completed abnormally if a transporting problem occurs during the transport of the subject article. However, by displaying the number of the transport data for the transport operations that are completed abnormally on the display means according to the kind of one or both of the articles and the items held in the articles that are the subject of the transport operations of the transport data, the display means would show the tendency that the transport data for the kind of the article or of the items held in the article has a greater number of data for which the transport operations are completed abnormally if and when the cause of the transporting problem is unique to the kind of articles or the items held therein (for example, because the items tend to fall or move from proper positions). Thus, it would be easier for an operator to notice that the cause of the transporting problem is a unique to the kind of article or the items, which would make it possible to take appropriate measures.

In an embodiment of the article processing facility in accordance with the present invention, a plurality of article transporting apparatuses among which an article can be transferred are preferably provided as the at least one article transport device. And a plurality of apparatus control devices, each of which controls operation of a respective one of the plurality of article transporting apparatuses, are preferably provided as the transport control means. And the managing control means is preferably configured to sequentially issue the transport command to each of the plurality of apparatus control devices based on the transport data, in order to transport the article to be transported from the transport origin to the transport destination by relaying the article with the plurality of article transporting apparatuses. And the display control means is preferably configured to be able to display a layout view which displays symbols each of which represents respective one of the plurality of article transporting apparatuses such that each symbol corresponds to a location of the respective one of the plurality of article transporting apparatuses and to display, as transport-data-related information, a number of the transport data that specify transport operations which a corresponding article transporting apparatus is assigned to perform such that the displayed number corresponds to the symbol that represents the corresponding article transporting apparatus in the layout view.

With such a configuration, since the managing control means sequentially issues a transport command to each of the plurality of apparatus control devices, the operation of each of the plurality of article transporting apparatus is controlled by the respective one of the plurality of apparatus control devices to relay the article to be transported from the transport origin to the transport destination. And since the display control means displays a layout view which displays symbols each of which represents respective one of the plurality of article transporting apparatuses such that each symbol corresponds to the location of the respective one of the plurality of article transporting apparatuses, the symbols of the article transporting apparatuses are displayed on the layout screen such that the locations of the symbols are consistent with, or in agreement with, the actual locations of the article transporting apparatuses. And, the number of the transport data which specify the transport operations that a particular article transporting apparatus is assigned to perform is displayed as transport-data-related information such that the location of the number corresponds to the symbol that represents the article transporting apparatus on the layout view.

Therefore, since all an operator has to do is simply to select with the selecting means the displayed number of the transport data that is displayed to correspond with the symbol for the article transporting apparatus displayed in the layout view, the operator can accurately select the transport-data-associated information displayed on the display means to cause the display means to display the attribute information of the article that is specified by desired transport data as the subject of a transport operation among the transport data that the article transporting apparatus is assigned to.

Thus, with this characteristic configuration, the attribute information of the article that is specified by desired transport data as the subject of a transport operation can be accurately viewed.

In an embodiment of the article processing facility in accordance with the present invention, a plurality of article transporting apparatuses among which an article can be transferred are preferably provided as the at least one article transport device. And a plurality of apparatus control devices, each of which controls operation of a respective one of the plurality of article transporting apparatuses, are preferably provided as the transport control means. And the managing control means is preferably configured to issue the transport command to each of the plurality of apparatus control devices sequentially based on the transport data, in order to transport the article to be transported from the transport origin to the transport destination by relaying the article with the plurality of article transporting apparatuses. And the display control means is preferably configured to be able to display a layout view which displays symbols each of which represents respective one of the plurality of article transporting apparatuses such that each symbol corresponds to a location of the respective one of the plurality of article transporting apparatuses and to display on the layout view as the transport-data-related information a symbol that represents an article that is a subject of a transport operation specified by the transport data such that the symbol representing the article corresponds to an actual transport location of the article, and to display the transport data for the article or the attribute information on the display means when the symbol for the article is selected with the selecting means.

With such a configuration, since the managing control means sequentially issues a transport command to each of the plurality of apparatus control devices, the operation of each of the plurality of article transporting apparatus is controlled by the respective one of the plurality of apparatus control devices to relay the article to be transported from the transport origin to the transport destination. And since the display control means displays a layout view which displays symbols each of which represents respective one of the plurality of article transporting apparatuses such that each symbol corresponds to a location of the respective one of the plurality of article transporting apparatuses, the symbols of the article transporting apparatuses are displayed on the layout screen such that the locations of the symbols are consistent with, or in agreement with, the actual locations of the article transporting apparatuses. And the symbol that represents an article that is a subject of a transport operation specified by the transport data is displayed on the layout view as the transport-data-related information such that the symbol representing the article corresponds to the actual transport location of the article. And the transport data for the article or the attribute information is displayed on the display means when the symbol for the article is selected with the selecting means.

Therefore, since an operator can cause the transport data for the article or its attribute information to be displayed on the display means simply by selecting with the selecting means the symbol that represents the article on the layout screen, the transport data for the article and its attribute information can be viewed and checked accurately and easily.

In an embodiment of the article processing facility in accordance with the present invention, the display control means is preferably configured to expand an view of an area to be expanded in the layout view in association with a selection of the area to be expanded by means of the selecting means.

With such a configuration, an view of an area to be expanded in the layout view is expanded in association with a selection of the area to be expanded by means of the selecting means. Therefore, when the symbols for the articles or for the article transporting apparatuses in the layout view displayed on the display means are small because the facility is large and it is difficult to select the symbols, the operator can select the area for expansion to cause the area to be expanded so that the larger symbols for the articles and for the article transporting apparatuses are displayed in the layout view, which makes it easier to select the symbols for the articles and for the article transporting apparatuses in the layout view.

ALTERNATIVE EMBODIMENTS

While the invention made by the inventor has been specifically described above with reference to an embodiment of invention, the present invention is not limited to the embodiment described above. And various modifications may be made to the invention without diverting from the spirit thereof. Examples of some alternative embodiments of the present invention are described next.

(1) In the embodiment described above, an example configuration is described in which, when a symbol that represents an article in the layout view is selected with the selecting means, the contents of the transport data that specifies the article represented by the symbol as the subject of a transport operation are displayed. Instead, when a symbol that represents an article in the layout view is selected with the selecting means, the display means may be configured to display the display options by means of which either the transport data about the article in question or its attribute information may be selected for display, and to display the transport data if the transport data display option is selected in the display options with the selecting means, and to display the attribute information if the attribute information display option is selected with the selecting means.

For example, when a symbol B is selected by placing the mouse cursor over the symbol B for an article, the system may be configured to display an menu option where "Transport Data" and "Goods and Operations Data" are arranged with one above the other, and to display the selected information by selecting either option by a click operation of the mouse etc.

(2) The way the objects are displayed on the screen of the terminals M illustrated in the embodiment described above is merely an example, and the way to display objects such as transport-data-associated information may be modified to suit a given situation.

(3) In the embodiment described above, an automated storage facility including automated warehouse units 8, self-propelling transport carriages 10, and item handling conveyors 12 is shown as an article processing facility; however, an article processing facility may have a single article transporting apparatus, or may be one which does not include an automated storage facility, or may be other type of article processing facility such as an unmanned vehicle system, a monorail system, or a linear motor transport system.

(4) While an example is described in the embodiment described above in which three terminals M are installed, the number and the locations of the terminals M may be changed or modified to suit a given situation. In addition, one or more terminals may be a mobile terminal which is connected wirelessly to a communication network.

(5) In the embodiment described above, an example is described in which the display control means and the display means are implemented separately by the monitoring device S and the terminal M, the display control means and the display means may be implemented by the monitoring device S and an image display portion provided thereto. Alternatively, the display control means may be implemented by a terminal M in addition to one of the operation command device C0, the operation managing device C1, or the transport managing device C2, that is provided separately from the terminal M.

(6) While an example is described in which one operation managing device C1 is provided in the embodiment described above, more than one operation managing devices may be provided. In this case, operation managing devices C1 preferably splits the managing tasks so that each operation managing device C1 manages a group of transport control devices for the article transporting apparatuses with different transporting apparatuses divided into different groups depending on the type of the apparatus. (7) In the embodiment described above, an example is described in which each terminal M has a keyboard 17 and a mouse 18 as input means. Instead, or in addition to this arrangement, the display portion 15 may have a touch-panel function or other position sensor function so that the display portion 15 may also function as the input means. In addition, other devices belonging to the conventional technology, such as a light pen or a camera, may also be used as input means.

(8) In the embodiment described above, an example is described in which the transport-data-associated information is with the mouse 18; however, the transport-data-associated information may be selected by the keyboard 17. In addition, when the display portion 15 has a touch-panel function or other position sensor function, the transport-data-associated information may be selected by an operation involving an operator contacting the display portion 15 or an operation without the actual contact. Further, a method of selecting or inputting by means of one or more input devices, such as a mouse, a keyboard, and/or, a light pen, or by using operator's finger or fingers is not limited to the act of simply placing the cursor over the symbol to be selected, or of a single clicking, double-clicking, right-clicking the symbol, etc. and may be performed by the use of other known action such as dragging, tapping, pinching, or a gesture depending on the input device.

(9) In the embodiment described above, when an analysis display command for analyzing and displaying the transport data for transport operations that terminated abnormally is issued, the display control means G is configured: to obtain from the operation managing device C1 the goods code which is the kind information of the goods held in the container 1 as the kind information which is attribute information associated with the transport key of the transport data for transport operations that terminated abnormally to analyze the transport data for the transport operations that terminated abnormally, and; to display on the display portion 15 the number of abnormal transporting data for each goods code of the goods held in the container 1 that is the subject of the transport operation of the transport data. However, when more than one kind of containers 1 are used in the facility, when an analysis display command is issued, the display control means G may be configured: to obtain from the operation managing device C1 the container code which is the kind information for the containers 1 themselves as the kind information which is attribute information associated with the transport key of the transport data for transport operations that terminated abnormally to analyze the transport data for the transport operations that terminated abnormally, and; to display on the display portion 15 the number of abnormal transporting data for each container code of the containers 1 that are the subject of the transport operation of the transport data. In addition, when an analysis display command is issued, the display control means G may be configured: to obtain from the operation managing device C1 both the container code and the goods code which are the kind information which is attribute information associated with the transport key of the transport data for transport operations that terminated abnormally to analyze the transport data for the transport operations that terminated abnormally, and; to display on the display portion 15 the number of abnormal transporting data for each container code of the containers 1 that are the subject of the transport operation of the transport data as well as for each goods code.

What is claimed is:

1. An article processing facility comprising:
   at least one article transport device for transporting an article to be transported;
   a transport controller for controlling an operation of the at least one article transport device;
   a managing controller for managing transport data which is generated by associating a transport origin and a transport destination for the article to be transported with unique identifying information, and for transmitting to the transport controller a transport command for transporting an article to be transported from the transport origin to the transport destination based on the transport data for the article to be transported;
   a display controller for causing display portion to display transport-data-associated information that corresponds to the transport data, based on the transport data managed by the managing controller;
   a manually operated selector for selecting the transport-data-associated information displayed on the display portion;
   wherein the managing controller is configured to manage and store attribute information for one or more items held in the article that is a subject of a transport operation for the transport data such that the attribute information is associated with the identifying information that identifies the transport data, and
   wherein when the transport-data-associated information displayed on the display portion is selected with the selector, the display controller is configured to obtain from the managing controller the attribute information associated with the identifying information for the transport data that corresponds to the transport-data-associated information, and to display the attribute information on the display portion.

2. An article processing facility comprising:
   at least one article transport device for transporting an article to be transported;
   a transport controller for controlling an operation of the at least one article transport device;
   a managing controller for managing transport data which is generated by associating a transport origin and a transport destination for the article to be transported with unique identifying information, and for transmitting to the transport controller a transport command for transporting an article to be transported from the transport origin to the transport destination based on the transport data for the article to be transported;
   a display controller for causing display portion to display transport-data-associated information that corresponds to the transport data, based on the transport data managed by the managing controller;
   a manually operated selector for selecting the transport-data-associated information displayed on the display portion;
   wherein the managing controller is configured to manage and store attribute information for the article that is a subject of a transport operation for the transport data such that the attribute information is associated with the identifying information that identifies the transport data, and
   wherein when the transport-data-associated information displayed on the display portion is selected with the selector, the display controller is configured to obtain from the managing controller the attribute information associated with the identifying information for the transport data that corresponds to the transport-data-associated information, and to display the attribute information on the display portion,
   wherein the managing controller is configured to manage the transport data for a plurality of articles to be transported such that the transport data for which transport operations from the transport origins to the transport destinations are completed normally are distinguished from the transport data for which transport operations are completed abnormally, and wherein when an analysis display command for analyzing and displaying the transport data for transport operations that are completed abnormally, the display controller is configured to obtain from the managing controller kind information which identifies kinds of one or both of the articles and items that are held in the articles as the attribute information associated with the identifying information for the transport data for transport operations that are completed abnormally, and to display on the display portion a number of the transport data for transport operations that are completed abnormally according to the kind of one or both of the articles and the items held in the articles that are subjects of transport operations for the transport data.

3. An article processing facility comprising:

at least one article transport device for transporting an article to be transported;

a transport controller for controlling an operation of the at least one article transport device;

a managing controller for managing transport data which is generated by associating a transport origin and a transport destination for the article to be transported with unique identifying information, and for transmitting to the transport controller a transport command for transporting an article to be transported from the transport origin to the transport destination based on the transport data for the article to be transported;

a display controller for causing display portion to display transport-data-associated information that corresponds to the transport data, based on the transport data managed by the managing controller;

a manually operated selector for selecting the transport-data-associated information displayed on the display portion;

wherein the managing controller is configured to manage and store attribute information for the article that is a subject of a transport operation for the transport data such that the attribute information is associated with the identifying information that identifies the transport data, and wherein when the transport-data-associated information displayed on the display portion is selected with the selector, the display controller is configured to obtain from the managing controller the attribute information associated with the identifying information for the transport data that corresponds to the transport-data-associated information, and to display the attribute information on the display portion, wherein a plurality of article transporting apparatuses among which an article can be transferred are provided as the at least one article transport device, wherein a plurality of apparatus control devices, each of which controls operation of a respective one of the plurality of article transporting apparatuses, are provided as the transport controller, wherein the managing controller is configured to issue the transport command to each of the plurality of apparatus control devices sequentially based on the transport data, in order to transport the article to be transported from the transport origin to the transport destination by relaying the article with the plurality of article transporting apparatuses, and wherein the display controller is configured to display a layout view which displays symbols each of which represents respective one of the plurality of article transporting apparatuses such that each symbol corresponds to a location of the respective one of the plurality of article transporting apparatuses and to display on the layout view as transport-data-related information a symbol that represents an article that is a subject of a transport operation specified by the transport data such that the symbol representing the article corresponds to an actual transport location of the article, and to display the transport data for the article or the attribute information on the display portion when the symbol for the article is selected with the selector.

4. A method of operation of an article processing facility comprising:

generating transport data by associating a transport origin and a transport destination for an article to be transported with unique identifying information;

managing and storing attribute information for one or more items held in the article that is a subject of a transport operation for the transport data such that the attribute information is associated with the identifying information that identifies the transport data;

configuring the article processing facility such that a transport command for transporting an article to be transported from a transport origin to a transport destination is transmitted to a transport controller that controls the operation of the at least one article transport device based on the transport data for the article to be transported;

configuring the article processing facility such that transport-data-associated information that corresponds to the transport data is displayed on a display portion;

configuring the article processing facility such that, when the transport-data-associated information displayed on the display portion is selected with a selector, the attribute information associated with the identifying information for the transport data that corresponds to the transport-data-associated information is obtained to display the attribute information on the display portion.

5. A method of operation of an article processing facility comprising:

generating transport data by associating a transport origin and a transport destination for an article to be transported with unique identifying information;

managing and storing attribute information for the article that is a subject of a transport operation for the transport data such that the attribute information is associated with the identifying information that identifies the transport data;

configuring the article processing facility such that a transport command for transporting an article to be transported from a transport origin to a transport destination is transmitted to a transport controller that controls the operation of the at least one article transport device based on the transport data for the article to be transported;

configuring the article processing facility such that transport-data-associated information that corresponds to the transport data is displayed on a display portion;

configuring the article processing facility such that, when the transport-data-associated information displayed on the display portion is selected with a selector, the attribute information associated with the identifying information for the transport data that corresponds to the transport-data-associated information is obtained to display the attribute information on the display portion, wherein the transport data for a plurality of articles to be transported is managed such that the transport data for which transport operations from the transport origins to the transport destinations are completed normally are distinguished from the transport data for which transport operations are completed abnormally, and the method further comprising:

when an analysis display command for analyzing and displaying the transport data for transport operations that are completed abnormally, obtaining kind information which identifies kinds of one or both of the articles and items that are held in the articles as the attribute information associated with the identifying information for the transport data for transport operations that are completed abnormally, and displaying on the display portion a number of the transport data for transport operations that are completed abnormally according to the kind of one or both of the articles and the items held in the articles that are subjects of transport operations for the transport data.

6. A method of operation of an article processing facility comprising:

generating transport data by associating a transport origin and a transport destination for an article to be transported with unique identifying information;

managing and storing attribute information for the article that is a subject of a transport operation for the transport data such that the attribute information is associated with the identifying information that identifies the transport data;

configuring the article processing facility such that a transport command for transporting an article to be transported from a transport origin to a transport destination is transmitted to a transport controller that controls the operation of the at least one article transport device based on the transport data for the article to be transported;

configuring the article processing facility such that transport-data-associated information that corresponds to the transport data is displayed on a display portion;

configuring the article processing facility such that, when the transport-data-associated information displayed on the display portion is selected with a selector, the attribute information associated with the identifying information for the transport data that corresponds to the transport-data-associated information is obtained to display the attribute information on the display portion, wherein a plurality of article transporting apparatuses among which an article can be transferred are provided as the at least one article transport device, wherein a plurality of apparatus control devices, each of which controls operation of a respective one of the plurality of article transporting apparatuses, are provided as the transport controller, wherein the step of configuring the article processing facility such that a transport command is transmitted to the transport controller includes sequentially issuing the transport command to each of the plurality of apparatus control devices based on the transport data, in order to transport the article to be transported from the transport origin to the transport destination by relaying the article with the plurality of article transporting apparatuses, and wherein the step of configuring the article processing facility such that transport-data-associated information that corresponds to the transport data is displayed on the display portion includes configuring the article processing facility such that a layout view which displays symbols each of which represents respective one of the plurality of article transporting apparatuses is displayed such that each symbol corresponds to a location of the respective one of the plurality of article transporting apparatuses and such that a number of the transport data that specify transport operations which a corresponding article transporting apparatus is assigned to perform is displayed as transport-data-related information such that the displayed number corresponds to the symbol that represents the corresponding article transporting apparatus in the layout view.

7. An article processing facility comprising:

at least one article transport device for transporting an article to be transported;

a transport controller for controlling an operation of the at least one article transport device;

a managing controller for managing transport data which is generated by associating a transport origin and a transport destination for the article to be transported with unique identifying information, and for transmitting to the transport controller a transport command for transporting an article to be transported from the transport origin to the transport destination based on the transport data for the article to be transported;

a display controller for causing display portion to display transport-data-associated information that corresponds to the transport data, based on the transport data managed by the managing controller;

a manually operated selector for selecting the transport-data-associated information displayed on the display portion;

wherein the managing controller is configured to manage and store attribute information for the article that is a subject of a transport operation for the transport data such that the attribute information is associated with the identifying information that identifies the transport data, wherein when the transport-data-associated information displayed on the display portion is selected with the selector, the display controller is configured to obtain from the managing controller the attribute information associated with the identifying information for the transport data that corresponds to the transport-data-associated information, and to display the attribute information on the display portion, wherein a plurality of article transporting apparatuses among which an article can be transferred are provided as the at least one article transport device, wherein a plurality of apparatus control devices, each of which controls operation of a respective one of the plurality of article transporting apparatuses, are provided as the transport controller, wherein the managing controller is configured to sequentially issue the transport command to each of the plurality of apparatus control devices based on the transport data, in order to transport the article to be transported from the transport origin to the transport destination by relaying the article with the plurality of article transporting apparatuses, and wherein the display controller is configured to display a layout view which displays symbols each of which represents respective one of the plurality of article transporting apparatuses such that each symbol corresponds to a location of the respective one of the plurality of article transporting apparatuses and to display, as transport-data-related information, a number of the transport data that specify transport operations which a corresponding article transporting apparatus is assigned to perform such that the displayed number corresponds to the symbol that represents the corresponding article transporting apparatus in the layout view.

8. The article processing facility as defined in claim 7, wherein the display controller is configured to expand an view of an area to be expanded in the layout view in association with a selection of the area to be expanded by means of the selector.

9. A method of operation of an article processing facility comprising:

generating transport data by associating a transport origin and a transport destination for an article to be transported with unique identifying information;

managing and storing attribute information for the article that is a subject of a transport operation for the transport data such that the attribute information is associated with the identifying information that identifies the transport data;

configuring the article processing facility such that a transport command for transporting an article to be transported from a transport origin to a transport destination is transmitted to a transport controller that controls the operation of the at least one article transport device based on the transport data for the article to be transported;

configuring the article processing facility such that transport-data-associated information that corresponds to the transport data is displayed on a display portion;

configuring the article such that, when the transport-data-associated information displayed on the display portion is selected with a selector, the attribute information associated with the identifying information for the transport data that corresponds to the transport-data-associated information is obtained to display the attribute information on the display portion, wherein a plurality of article transporting apparatuses among which an article can be transferred are provided as the at least one article transport device, wherein a plurality of apparatus control devices, each of which controls operation of a respective one of the plurality of article transporting apparatuses, are provided as the transport controller, wherein the step of configuring the article processing facility such that a transport command is transmitted to the transport controller includes sequentially issuing the transport command to each of the plurality of apparatus control devices based on the transport data, in order to transport the article to be transported from the transport origin to the transport destination by relaying the article with the plurality of article transporting apparatuses, and wherein the step of configuring the article processing facility such that transport-data-associated information that corresponds to the transport data is displayed on the display portion includes configuring the article processing facility such that:

a layout view which displays symbols each of which represents respective one of the plurality of article transporting apparatuses is displayed such that each symbol corresponds to a location of the respective one of the plurality of article transporting apparatuses;

a symbol that represents an article that is a subject of a transport operation specified by the transport data is displayed on the layout view as transport-data-related information such that the symbol representing the article corresponds to an actual location of the article; and the transport data for the article or the attribute information is displayed on the display portion when the symbol for the article is selected with the selector.

10. The method as defined in claim 9, further comprising:

expanding an view of an area to be expanded in the layout view in association with a selection of the area to be expanded by means of the selector.

* * * * *

UNITED STATES PATENT AND TRADEMARK OFFICE
CERTIFICATE OF CORRECTION

| | |
|---|---|
| PATENT NO. | : 9,063,538 B2 |
| APPLICATION NO. | : 13/600818 |
| DATED | : June 23, 2015 |
| INVENTOR(S) | : Kenji Yagawa |

Page 1 of 1

It is certified that error appears in the above-identified patent and that said Letters Patent is hereby corrected as shown below:

IN THE CLAIMS

Column 27, Line 29, Claim 9, after "article" insert -- processing facility --

Signed and Sealed this
Twenty-second Day of December, 2015

Michelle K. Lee
*Director of the United States Patent and Trademark Office*